(12) United States Patent
Hornby et al.

(10) Patent No.: US 9,453,486 B1
(45) Date of Patent: Sep. 27, 2016

(54) GAS DIRECT INJECTOR WITH REDUCED LEAKAGE

(71) Applicant: Continental Automotive Systems, Inc., Auburn Hills, MI (US)

(72) Inventors: Michael J Hornby, Williamsburg, VA (US); Klaus Husslein, Regensburg (DE); Harry Schüle, Neunburg (DE); Christopher Heukenroth, Berlin (DE); Wolfram Klemp, Berlin (DE); Thomas Komischke, Berlin (DE); Thomas Gerlach, Hamburg (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/664,367

(22) Filed: Mar. 20, 2015

(51) Int. Cl.
| | |
|---|---|
| *F02D 1/06* | (2006.01) |
| *F02M 63/00* | (2006.01) |
| *F02M 51/06* | (2006.01) |
| *F02M 61/16* | (2006.01) |

(52) U.S. Cl.
CPC ..... *F02M 63/0077* (2013.01); *F02M 51/0614* (2013.01); *F02M 51/0685* (2013.01); *F02M 61/166* (2013.01); *F02M 63/0019* (2013.01); *F02M 63/0022* (2013.01); *F02M 63/0075* (2013.01)

(58) Field of Classification Search
CPC ............ F02M 63/0077; F02M 51/0614; F02M 51/0685; F02M 61/166; F02M 63/0019; F02M 63/0022; F02M 63/0075
USPC ......... 239/5, 584, 585.1–585.5, 600, DIG. 4; 277/313, 591, 598; 123/294, 467, 470
See application file for complete search history.

(56) References Cited

U.S. PATENT DOCUMENTS

| | | | | |
|---|---|---|---|---|
| 6,186,123 | B1 * | 2/2001 | Maier | F02M 53/04 277/313 |
| 7,069,908 | B2 * | 7/2006 | Ohkubo | F02M 61/14 123/470 |
| 7,229,064 | B2 | 6/2007 | Miller et al. | |
| 7,261,089 | B2 * | 8/2007 | Hoenig | F02M 61/14 123/467 |
| 7,455,906 | B2 | 11/2008 | Grosse et al. | |
| 7,658,631 | B2 * | 2/2010 | Coldren | F02M 51/005 239/585.1 |
| 2004/0187798 | A1 | 9/2004 | Schneider et al. | |
| 2006/0231785 | A1 | 10/2006 | Hans et al. | |
| 2015/0000641 | A1 | 1/2015 | Mitter et al. | |

(Continued)

FOREIGN PATENT DOCUMENTS

| | | |
|---|---|---|
| BE | 102014212562 A1 | 4/2015 |
| DE | 10251587 A1 | 5/2004 |

(Continued)

*Primary Examiner* — Steven J Ganey

(57) ABSTRACT

An injector has an inlet and an outlet and an armature tube having passage structure and having a distal end spaced from the outlet. The passage structure communicates with the inlet. A movable, magnetic armature is coupled to the armature tube. An electromagnetic coil is associated with a stator and with the armature. A first spring is constructed and arranged, when the coil is not activated, to bias the armature tube so that the distal end engages in a sealing manner with a first seat to limit leakage of the gaseous fuel from the outlet. A second valve is movable in a valve body. A second spring is constructed and arranged, when the coil is not activated, to bias the second valve so that a seating surface thereof engages a second seat to close the outlet.

19 Claims, 4 Drawing Sheets

(56) References Cited

U.S. PATENT DOCUMENTS

| | | |
|---|---|---|
| 2015/0001319 A1 | 1/2015 | Foerster et al. |
| 2015/0204276 A1 | 7/2015 | Jaegle et al. |

FOREIGN PATENT DOCUMENTS

| | | |
|---|---|---|
| DE | 10258859 A1 | 7/2004 |
| DE | 10304143 A1 | 8/2004 |
| DE | 10352287 A1 | 6/2005 |
| DE | 102004048602 A1 | 4/2006 |
| DE | 102004048603 A1 | 4/2006 |
| DE | 102004048604 A1 | 4/2006 |
| DE | 102005046434 A1 | 3/2007 |
| DE | 102005049984 A1 | 4/2007 |
| DE | 102006040649 A1 | 3/2008 |
| DE | 102007003213 A1 | 7/2008 |
| DE | 102007003214 A1 | 7/2008 |
| DE | 102007003215 A1 | 7/2008 |
| DE | 102007004560 A1 | 7/2008 |
| DE | 102007031306 A1 | 1/2009 |
| DE | 102008000505 A1 | 9/2009 |
| DE | 102008001017 A1 | 10/2009 |
| DE | 102008001844 A1 | 11/2009 |
| DE | 102008041544 A1 | 3/2010 |
| DE | 102008055098 A1 | 6/2010 |
| DE | 102012211573 A1 | 1/2014 |
| DE | 102005043969 B4 | 5/2014 |
| DE | 102013222025 A1 | 4/2015 |
| DE | 102013222030 A1 | 4/2015 |
| EP | 2788614 B1 | 8/2004 |
| EP | 1690026 A1 | 9/2008 |
| EP | 1685321 B1 | 3/2009 |
| WO | 2007093454 A1 | 8/2007 |
| WO | 2013083626 A1 | 6/2013 |
| WO | 2014127873 A1 | 8/2014 |
| WO | 2014127874 A1 | 8/2014 |

* cited by examiner

GAS DIRECT INJECTOR WITH REDUCED LEAKAGE

FIELD

The invention relates to a gas injector, where the gas could be natural gas (CNG or LNG), hydrogen or liquefied petroleum gas (LPG) or any mixtures of these gases and engine fuel systems and, more particularly, to a gas direct injector that reduces tip leakage.

BACKGROUND

With gas injectors, tip leakage must be very low. In port gas injectors, the low leakage is achieved with an elastomeric seal. A problem with the direct gas injector is that the tip of the injector is too hot for an elastomeric seal at the tip. Conventional gas direct injectors use a metal-to-metal sealing solenoid valve. This metal-to-metal sealing will not meet leakage requirements.

Thus, there is a need to provide a low leakage gas direct injector using an additional elastomer sealing valve that is remote from the injector tip.

SUMMARY

An objective of the invention is to fulfill the need referred to above. In accordance with the principles of an embodiment, this objective is obtained by providing an injector having an inlet and an outlet for injecting gaseous fuels into an internal combustion engine. The injector includes an armature tube having passage structure and having a distal end spaced from the outlet. The passage structure communicates with the inlet. A movable, magnetic armature is coupled to the armature tube to define a first valve. A stator is spaced from the armature in a closed position of the injector, thereby defining a working air gap between the stator and the armature. An electromagnetic coil is associated with the stator and the armature. A first seat is associated with the distal end of the armature tube. A first spring is constructed and arranged, when the coil is not activated, to bias the armature tube so that the distal end engages in a sealing manner with the first seat close the passage structured and limit leakage of the gaseous fuel from the outlet. A valve body has an interior portion and a second seat at the outlet. A second valve is movable in the interior portion of the valve body. A second spring is constructed and arranged, when the coil is not activated, to bias the second valve so that a seating surface thereof engages the second seat to close the outlet. The first and second valves and the first and second springs are constructed and arranged such that when the coil is activated causing the armature and thus the armature tube to move with respect to the stator so that the distal end disengages from the first seat opening the passage structure and causing gaseous fuel to pass the first seat, pressure of the gaseous fuel causes the second valve to move against the bias of the second spring so that the seating surface disengages from the second seat to cause the gaseous fuel to exit the outlet.

In accordance with another aspect of an embodiment, a method limits leakage of a direct injector that has an inlet and an outlet for injecting gaseous fuels into an internal combustion engine. The injector also has an armature tube coupled to a movable armature, the armature tube having passage structure and having a distal end spaced from the outlet, the passage structure communicating with the inlet; a stator and a coil associated with the armature for causing movement of the armature and thus the armature tube upon energizing the coil; a first seat associated with the distal end of the armature tube; and a second valve movable in a valve body of the injector and with respect to a second seat. When the coil is not activated, the distal end of the armature tube is caused to engage in a sealing manner with the first seat to close the passage structured and limit leakage of the gaseous fuel from the outlet, and a seating surface of the second valve is caused to engage the second seat to close the outlet. When the coil is activated causing the armature and thus the armature tube to move with respect to the stator so that the distal end disengages from the first seat opening the passage structure and causing gaseous fuel to pass the first seat, the method ensures that pressure of the gaseous fuel causes the second valve to move so that the seating surface disengages from the second seat to cause the gaseous fuel to exit the outlet.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
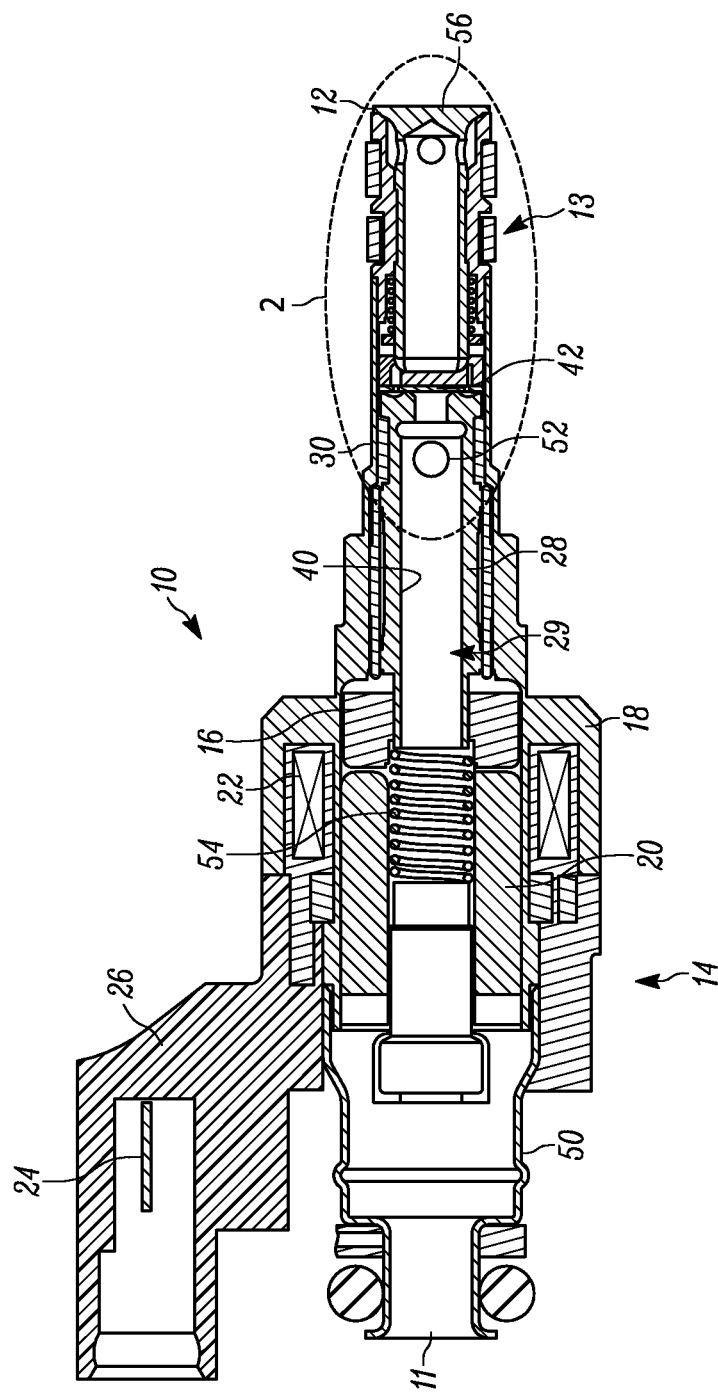
FIG. 1 is a cross-sectional view of a gas direct injector according to an embodiment.
Figure 2:
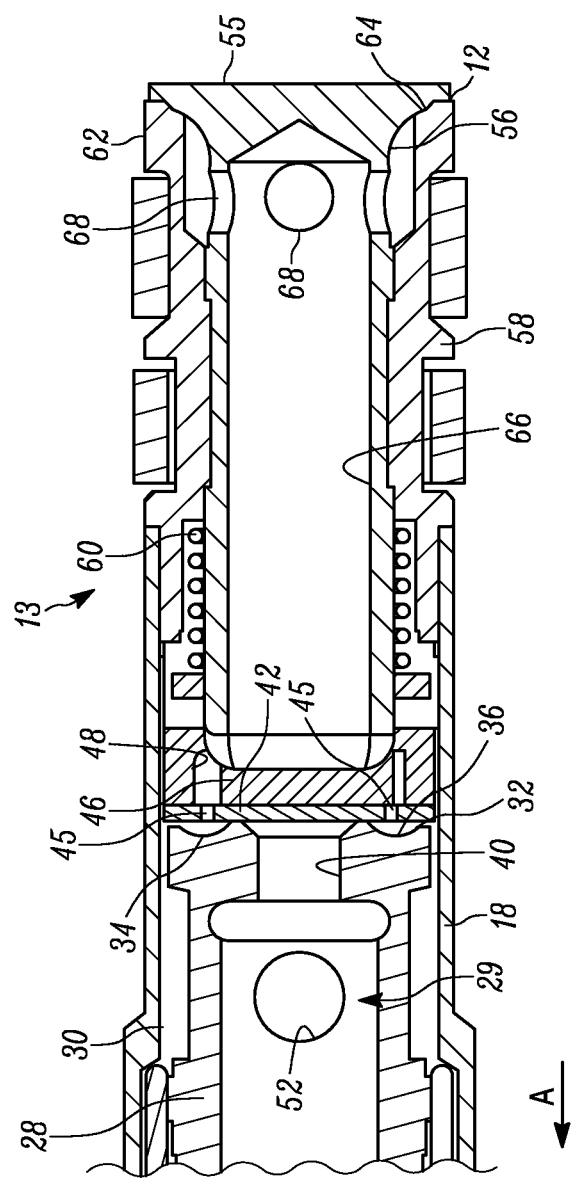
FIG. 2 is an enlarged view of the portion enclosed at 2 in FIG. 1.

With reference to FIGS. 1 and 2, a direct injector is shown, generally indicated at 10, in accordance with an embodiment and for use in injecting a gaseous fuel into an internal combustion engine of a vehicle. The injector 10 has an inlet 11 for receiving gaseous fuel and an outlet 12 for delivering the gaseous fuel to the engine (not shown). The gaseous fuels can be, for example, natural gas (CNG, LNG), hydrogen, LPG or any other gaseous fuel. The injector 10 includes valve group subassembly, generally indicated at 13, and a magnetic group subassembly, generally indicated at 14. The valve group subassembly 13 performs fluid handling functions, e.g., defining a fuel flow path and prohibiting fuel flow through the injector 10. The magnetic group subassembly 14 performs power functions, e.g., converting electrical signals to a magnetic driving force for permitting fuel flow through the injector 10.

With reference to FIG. 1, the magnetic group subassembly 14 comprises a movable magnetic armature 16 disposed in a housing 18 of the injector 10 generally adjacent to a stationary magnetic stator 20 to define the conventional working gap there-between in the closed position of the injector 10. An electromagnetic coil 22 is in the form of wire wound about a bobbin and is associated with the stator 20 and the armature 16. The coil 22 is connected to a source of power via terminals 24 in an over-molded plastic connector 26. The armature 16 is connected to an armature tube 28 so that the armature tube 28 moves with the armature 16 to define a first valve of the injector, shown generally indicated at 29.

Figure 4:
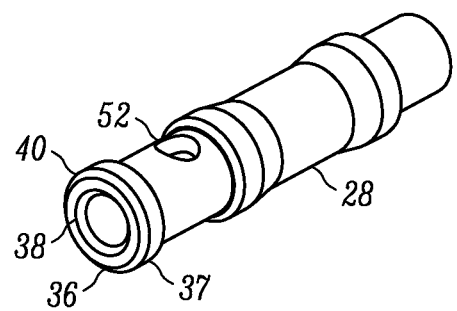
FIG. 4 is a perspective view of the armature tube of the injector of FIG. 1, shown with an elastomer member coupled to the end thereof.

As best shown in FIG. 2, the armature tube 28 is hollow and is disposed in the interior portion 30 of the housing 18. An end surface 32 of the armature tube 28 includes an annular groove 34, with an elastomer member 36 coupled to the end surface 32 and with a portion thereof disposed in the groove 34. The member 36 defines a distal end 37 of the armature tube 28. As best shown in FIG. 4, the member 36 has a passage 38 there-through that communicates with axial extending passage 40 in the armature tube 28, the function of which will be explained below.

Figure 3:
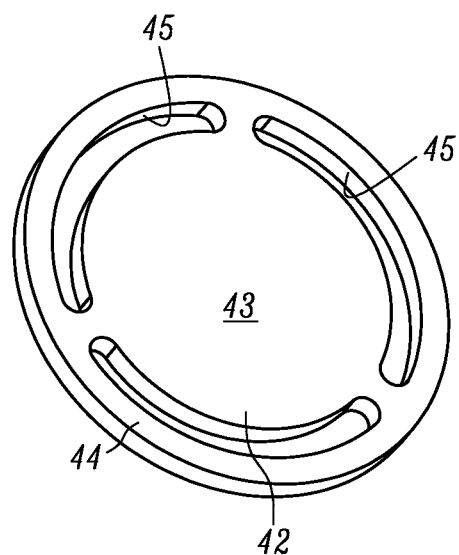
FIG. 3 is an enlarged view of a first seat of the injector of FIG. 2.

Returning to FIG. 2, a first valve seat 42 is fixed to the housing 18. The first seat 42 is disposed adjacent to the elastomer member 36 and provides the sealing surface for the member 36 in the closed position thereof. An enlarged view of the annular first seat 42 is shown in FIG. 3. The seat 42 is preferably made of stainless steel and includes a central sealing portion 43 and an outer sealing portion 44, with a plurality of circumferentially extending slots 45 located between the central and outer sealing portions. The slots 45 define gas flow passages through the seat 42. The slots 45 can be laser cut according to the injector application. In one application, the thickness of the seat 42 is preferably 0.4 mm with a slot width of about 0.3 mm. Other dimensions can be used based on the injector application. A backup member 46 provides a robust mechanical stop for the seat 42 to increase the life of the seat 42 and thus the active valve 29. The backup member 46 includes and annular passage 48 that communicates with the slots 45.

The passage 40 in the armature tube 28 and passage 38 in the member 36 communicate with the inlet 11 that is defined by an inlet tube assembly 50. The armature tube 28 also includes openings 52. The interior portion 30 and passages 38, 40 and openings 52 define passage structure, the function of which will be explained below. As shown in FIG. 2, when the coil 22 is not activated, a spring 54 biases the armature tube 28 so that the elastomer member 36 engages the sealing portions 43 and 44 of the first seat 42, thereby closing the passage structure and limiting leakage of the gaseous fuel from the armature tube 28 to the outlet 12 of the injector 10. It is noted that the elastomer member 36 is located remote from the tip 55 of the injector 10 (spaced from outlet 12) and thus is not directly exposed to the high temperature combustion at the tip 55. With the use of valve 29, leakage of fuel can be limited to less that about 0.2 cc/mm at 1500 kPa.

When the coil 22 is activated (energized), in response to the magnetic field, the armature 16 moves the armature tube 28 in the direction A in FIG. 2, so that the member 36 disengages from the first seat 42. The passage structure of the active valve 29 is thus opened and the gaseous fuel passes through the slots 45 in the seat 42 and the passage 48 in the backup member 46 for flow control. After the valve 29 opens, the pressure of the gaseous fuel opens a lower passive valve 56, which is part of the valve group subassembly 13.

Thus, with reference to FIG. 2, the passive valve 56 is movable with a valve body 58 of the injector 10. Passive valve 56 is located between the member 36 and the outlet 12 to space the member 36 from the outlet 12. In the closed position of the valve 56 (coil 22 not activated) a spring 60, carried by the valve body 58, biases the valve 56 in the direction A in FIG. 2 so that an annular seating surface 62 of the valve 56 engages a second seat 64 of the valve body 58 to close the outlet 12 to the combustion gasses. As noted above, when the coil 22 is activated and once the valve 29 opens, pressure of the fuel passing the seat 42 is exerted on the valve 56. Once this pressure is sufficient to overcome the bias of the spring 60, the seating surface 62 moves in the direction opposite direction A (outward opening) so as to disengage from the seat 64, permitting fuel to be dispensed though the passage 66 and orifices 68 of the passive valve 56 and the through the outlet 12 directly into the combustion chamber. Thus, the force of the spring 60 is selected so that a certain pressure of the fuel overcomes the spring force. With both valves 29 and 56 opened, the fuel flow rate can be up to about 12 g/s at 20 Bar. The injector is preferably configured to operate at a pressure range of about 3 to 23 Bar.

Figure 5:
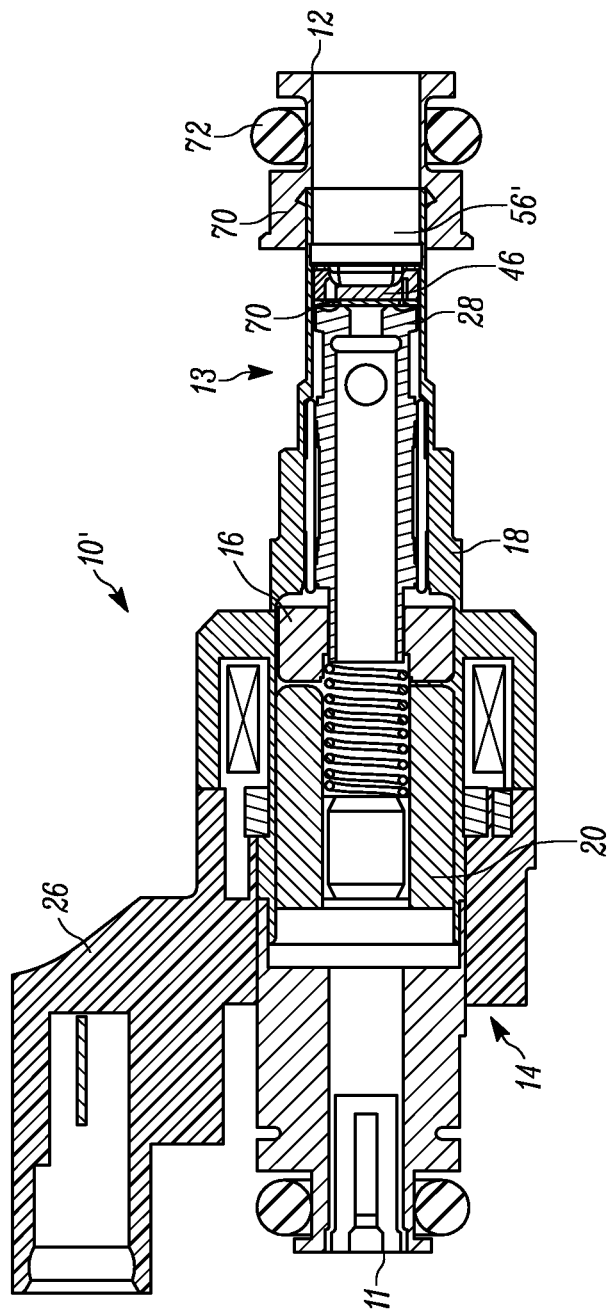
FIG. 5 is a cross-sectional view of a gas multi-port injector according to an embodiment.

FIG. 1 shows that the distal end of the injector 10 is configured to be mounted for direct injection into a combustion chamber. FIG. 5 shows another embodiment of a gas injector, generally indicated at 10'. This injector 10' is substantially similar to the injector 10 of FIG. 1, but is for use in multi-port injection systems. Thus, the distal end of the injector 10' includes a hollow mounting flange 70 coupled to the end of housing 18. An O-ring 72 is provided about a portion of the flange 70 for sealingly mounting with a port associated with an engine's intake valve (not shown).

Although the injectors 10, 10' have been described for use with natural gas, hydrogen, LPG or any other gaseous fuel, the injectors can be used in any gaseous automotive platform. The injectors 10 and 10' can fit into exiting packaging. Due to the valve group subassembly 13 and the magnetic group subassembly 14, the injectors 10, 10' are modular.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An injector having an inlet and an outlet for injecting gaseous fuels into an internal combustion engine, the injector comprising:
   an armature tube having passage structure and having a distal end spaced from the outlet, the passage structure communicating with the inlet,
   a movable, magnetic armature coupled to the armature tube to define a first valve,
   a stator spaced from the armature in a closed position of the injector, thereby defining a working air gap between the stator and the armature,
   an electromagnetic coil associated with the stator and the armature,
   a first seat associated with the distal end of the armature tube,
   a first spring constructed and arranged, when the coil is not activated, to bias the armature tube so that the distal end engages the first seat to close the passage structure and limit leakage of the gaseous fuel from the outlet,
   a valve body having an interior portion and a second seat at the outlet,
   a second valve movable in the interior portion of the valve body, and a second spring constructed and arranged, when the coil is not activated, to bias the second valve so that a seating surface thereof engages the second seat to close the outlet, wherein the first and second valves and the first and second springs are constructed and arranged such that when the coil is activated causing the armature and thus the armature tube to move with respect to the stator so that the distal end of the armature tube disengages from the first seat opening the passage structure and causing gaseous fuel to pass the first seat, pressure of the gaseous fuel causes the second valve to move against the bias of the second spring so that the seating surface disengages from the second seat to cause the gaseous fuel to exit the outlet, wherein the distal end of the armature tube includes an elastomer member constructed and arranged to engage the first seat in a sealing manner.

2. The injector of claim 1, wherein the first seat is annular having a central sealing portion, an outer sealing portion and flow passages there-through and located between the sealing portions such that 1) when the coil is not activated, the elastomer member of the armature tube engages the sealing portions and 2) when the coil is activated and the elastomer member disengages from the sealing portions, the gaseous fuel can pass through the flow passages.

3. The injector of claim 2, wherein the flow passages are slots extending circumferentially of the annular elastomer member.

4. The injector of claim 2, wherein an end surface of the armature tube includes an annular groove, with a portion of the elastomer member disposed in the groove.

5. The injector of claim 1, wherein the first seat is coupled to a back-up member that is fixed to a housing of the injector.

6. The injector of claim 1, wherein the second valve is located between the first valve and the outlet.

7. The injector of claim 1, wherein a distal end of the injector is constructed and arranged to be mounted for direct injection.

8. The injector of claim 1, further comprising a flange coupled to a distal end of the injector, with an O-ring associated with the flange so that the injector can be mounted for port injection.

9. The injector of claim 1, wherein, when the coil is activated, the second valve is constructed and arranged to move in a direction opposite the movement of the armature tube.

10. The injector of claim 1, in combination with the gaseous fuel, the gaseous fuel being natural gas, hydrogen, or LPG.

11. A method of limiting leakage of a direct injector, the injector comprising an inlet and an outlet for injecting gaseous fuels into an internal combustion engine, the injector further comprising an armature tube coupled to a movable armature to define a first valve, the armature tube having passage structure and having a distal end spaced from the outlet, the passage structure communicating with the inlet; a stator and a coil associated with the armature for causing movement of the armature and thus the armature tube upon energizing the coil; a first seat associated with the distal end of the armature tube; and a second valve movable within a valve body of the injector and with respect to a second seat, the method comprising the steps of:

when the coil is not activated, causing the distal end of the armature tube to engage in a sealing manner with the first seat and close the passage structure to limit leakage of the gaseous fuel from the outlet, and causing a seating surface of the second valve to engage the second seat to close the outlet, wherein the first seat has a central sealing portion, an outer sealing portion and flow passages there-through that are located between the sealing portions, and when the coil is activated causing the armature and thus the armature tube to move with respect to the stator so that the distal end disengages from the first seat opening the passage structure and causing gaseous fuel to pass the first seat, ensuring that pressure of the gaseous fuel causes the second valve to move so that the seating surface disengages from the second seat to cause the gaseous fuel to exit the outlet.

12. The method of claim 11, wherein the distal end of the armature tube includes an elastomer member for sealing with the first seat.

13. The method of claim 12, wherein the step of causing at the distal end of the armature tube to engage with the first seat includes:

using a spring to bias the armature tube so that the elastomer member engages the sealing portions and, when the coil is activated and the elastomer member disengages from the sealing portions, the gaseous fuel can pass through the flow passages.

14. The method of claim 12, further comprising:

limiting an exposure of the elastomer member to combustion temperatures by locating the second valve between the first valve and the outlet so that the elastomer member is spaced from the outlet.

15. The method of claim 11, wherein the step of causing a seating surface of the second valve to engage the second seat of the valve body includes:

using a spring to bias the second valve so that the seating surface engages the second seat.

16. The method of claim 15, wherein the step of ensuring that pressure of the gaseous fuel causes the second valve to move includes:

selecting a force of the spring so that a certain pressure of the fuel overcomes the force of the spring.

17. The method of claim 11, wherein, when the coil is energized, the second valve moves by the pressure in a direction opposite the movement of the armature tube.

18. The method of claim 11, further comprising:

configuring the injector so as to be mounted for direct injection into a combustion chamber of an engine.

19. The method of claim 11, wherein the gaseous fuel is natural gas, hydrogen, or LPG.

* * * * *